United States Patent Office 3,646,074
Patented Feb. 29, 1972

3,646,074
3,17-DIOXYGENATED 16α,17α-METHANO-5α-
ANDROSTANES AND UNSATURATED
CONGENERS
William F. Johns, Glenview, Ill., assignor to G. D. Searle
& Co., Chicago, Ill.
No Drawing. Continuation-in-part of application Ser. No.
766,300, Oct. 9, 1968. This application Nov. 26, 1969,
Ser. No. 880,394
Int. Cl. C07c *169/08, 169/20*
U.S. Cl. 260—397.4                    19 Claims

ABSTRACT OF THE DISCLOSURE

Preparation of the captioned compounds — for example, 3β,17β-diacetoxy-16α,17α-methano-5α-androstane — and the androgenic and anabolic utility thereof is disclosed.

---

This application is a continuation-in-part of my copending application Ser. No. 766,300, filed Oct. 9, 1968, now abandoned.

This invention relates to 3,17-dioxygenated 16α,17α-methano-5α-androstanes and unsaturated congeners thereof, and to processes for their preparation. More particularly, this invention provides new, useful, and unobvious steroids of the formulas

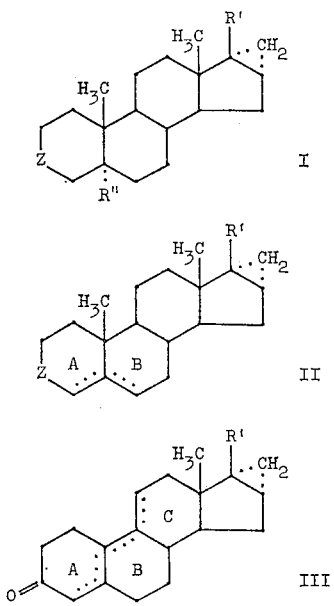

wherein R' represents hydroxy, alkanoyloxy, or alkoxy; R" represents hydrogen, hydroxy, or alkanoyloxy; Z represents β-hydroxymethylene, β-(alkanoyloxy)methylene, or carbonyl; the dotted lines in rings A and B of Formula II signify $\Delta^4$ unsaturation when Z therein represents carbonyl and $\Delta^5$ unsaturation when it does not; and the dotted lines in rings A, B, and C of Formula III signify $\Delta^4$, $\Delta^{5(10)}$, $\Delta^{4,9}$, $\Delta^{5(10),9(11)}$, or $\Delta^{4,9,11}$ unsaturation.

Among the alkanoyl constituents comprehended by R', R", and Z, lower alkanoyls are preferred, which is to say groupings of the formula

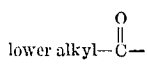

Likewise, the alkoxys contemplated by R' are preferably of lower order, thus having the formula lower alkyl—O—

Those skilled in the art will recognize that lower alkyls are saturated, monovalent, acyclic, straight- or branched-chain, hydrocarbon groupings of empirical formula $$-C_nH_{2n+1}$$

wherein $n$ represents a positive integer less than 8, and representatively illustrated by methyl, ethyl, propyl, isopropyl, butyl, isobutyl, sec.-butyl, tert.-butyl, pentyl, neopentyl, hexyl, isohexyl, heptyl, etc.

Equivalent to the foregoing compounds for the purposes of this invention are the solvates thereof in which physiologically insignificant solvent — for example, an equivalent amount of ethyl acetate — is present.

The compounds to which this invention relates are useful by reason of their valuable biological properties. Thus, for example, they are androgenic. Compounds typified by 17β - ethoxy - 16α,17α-methanoestr-4-en-3-one and 17β-ethoxy-16α,17α-methanoestra-4,9-dien-3-one also manifest, unexpectedly, exceedingly potent anabolic activity.

The androgenic activity of the instant compounds is evident from the results of standardized test for their capacity to stimulate the growth of seminal vesicle and ventral prostate glands in castrated immature male rats. The procedure is essentially that described by Saunders and Drill, Proc. Soc. Exp. Biol. Med., 94, 646 (1957). Male Sprague-Dawley rats are castrated at 22–24 days of age; and to each of a group of 5–9 such animals, beginning 19–21 days later, the compound to be tested, dissolved or suspended in corn oil or other physiologically inert vehicle, is administered intramuscularly or intragastrically in equally divided doses on each of 7 successive days. Commonly, the initial total dose is 5 mg. of compound in 0.7 ml. of corn oil administered intramuscularly or 15 mg. of compound in 1.4 ml. of corn oil administered intragastrically. A second group of 5 or more animals likewise and concurrently administered corn oil alone serves as controls. On the day after treatment is concluded, the animals are sacrificed; and the seminal vesicle and ventral prostate glands are excised and dissected free of extraneous tissue. Fluid is expressed from the vesicles (but not the prostates), whereupon the glands are blotted and weighed. A compound is considered androgenic if the mean weight of the vesicles in the group of animals treated therewith is significantly ($P \leq 0.01$) greater than the corresponding weight in the control group and there is a proportionate increase in the mean prostate weight for treats vis-a-vis control. Intramuscular potency of the compound, relative to testosterone propionate, is determined by repeating the test at progressively diminishing doses until the minimum effective dose is found, dividing this dose by the minimum effective dose of testosterone propionate in the same test, and multiplying the quotient by 100. Intragastric potency, relative to 17-methyltestosterone, is determined by dividing a dose at which the compound is found to be androgenic by that dose of 17-methyltestosterone sufficient to produce an identical response in the same test, and multiplying the quotient by 100.

The anabolic activity of the instant compounds is evident from the results of a standardized test identical with that described above for the determination of androgenic activity except that an increase in weight of the levator ani muscles of the test animals is used as the index of activity.

Those skilled in the art will recognize that observations of activity in standardized tests for particular biological effects are fundamental to the development of valuable new drugs, both veterinary and human.

Preparation of the compounds of Formula I proceeds by contacting a 16-dehydro steroid of the formula

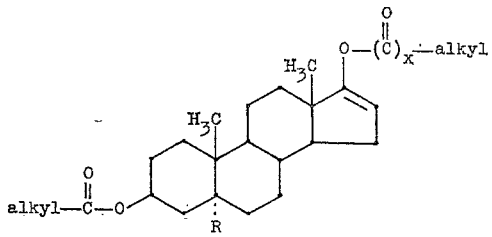

in which R represents hydrogen or alkanoyloxy and x represents 0 or 1 with diethylzinc and diiodomethane in butyl ether to give the corresponding 16α,17α-methano compound in which the ester group at carbon atom number 3 is preferentially hydrolyzed by contacting with aqueous potassium bicarbonate in methanol. Ester groups at both carbon atoms 3 and 17 are hydrolyzed by contacting with aqueous methanolic potassium hydroxide. Ester groups at all of carbon atoms 3, 5, and 17 are reduced to alcohols by contacting with lithium tetrahydroaluminate in ethereal tetrahydrofuran. The 3-hydroxy compounds are oxidized to 3-ones with chromium trioxide and pyridine. Since a 17-hydroxyl, if present, tends to be oxidized also under these conditions, it is preferable to prepare the 17-hydroxy-3-ones by oxidizing the corresponding 3-hydroxy-17-esters with chromium trioxide in aqueous acetonic sulfuric acid and then hydrolyzing the 17-esters.

The compounds of Formula II are prepared from a 5α-acetoxy-3β-ol of the formula

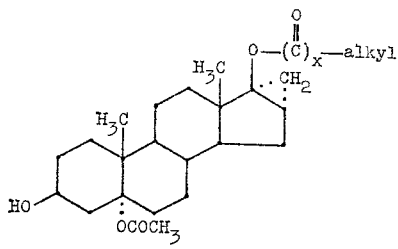

wherein x again represents 0 or 1 via prolonged contact with alumina in benzene whereby the elements of acetic acid are split out and the corresponding Δ⁵-3β-ol results. Oppenauer oxidation, in turn, affords the corresponding 4-en-3-one. Alternatively, the 3-hydroxyl is esterified by heating with an alkanoic acid anhydride in pyridine. Hydroylsis of ester groups at carbon atoms 3 and/or 17 is effected by the same techniques set forth in respect of the compounds of Formula I.

The 17-alkoxy compounds of Formula III are prepared by converting a 17-alkoxy-3-methoxyestra-1,3,5(10),16-tetraene

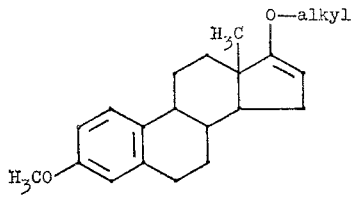

to the corresponding 16α,17α-methano compound with diethylzinc and diiodomethane in butyl ether, subjecting the methano compound to Birch reduction, and hydrolyzing the resultant enol ether with an alkanoic or mineral acid to afford the 5(10)-en-3-one or 4-en-3-one, respectively. From the 5(10)-en-3-one, on appropriate contact with cold pyridinium bromide perbromide and pyridine, the 4,9-dien-3-one eventuates. This compound is converted to the 5(10),9(11)-dien-3-one dimethyl acetal with methanolic hydrogen chloride, the acetal is hydrolyzed with sulfuric acid in acetone, whereupon contact with dichlorodicyanoquinone in benzene affords the 4,9,11-trien-3-one.

The 17-hydroxy and 17-alkanoyloxy compounds of Formula III are prepared by cleaving the ester linkage in 17β-acetoxy-16α,17α-methano-3-methoxyestra - 1,3,5(10)-triene with methyllithium in ether under nitrogen, preparing the trimethylsilyl ether of the resultant alcohol by contacting it with trimethylchlorosilane and hexamethyl-disilazane in pyridine, subjecting the ether to Birch reduction, and hydrolyzing the resultant enol diether with an alkanoic or mineral acid to afford the 17-hydroxy-5(10)/4-en-3-one. The 17-hydroxyl is esterified, if desired, by contacting with an alkanoic acid anhydride in pyridine; and the remaining 17-hydroxy/alkanoyloxy compounds of Formula III eventuate via the same procedures described above for preparation of their 17-alkoxy counterparts.

The following examples describe in detail compounds illustrative of the present invention and methods which have been devised for the preparation thereof. However, the invention is not to be construed as limited thereby, either in spirt or in scope, since it will be apparent to those skilled in the art of organic synthesis that many modifications, both of materials and of methods, may be practiced without departing from the purpose and intent of this disclosure. Throughout the examples hereinafter set forth, temperatures are given in degrees centigrade and relative amounts of materials in parts by weight, except as otherwise noted.

EXAMPLE 1

3β,17β-diacetoxy-16α,17α-methano-5α-androstane

To a solution of 108 parts of 3β,17β - diacetoxy - 5α-androst-16-ene in 480 parts of butyl ether is added, with stirring, 74 parts of diethylzinc in a nitrogen atmosphere. There is then stirred in, during a 20-minute period, 210 parts of diiodomethane. The resultant mixture is stirred for 24 hours and then cautiously diluted with 80 parts of ethanol, followed by 3 volumes of water and sufficient 5% hydrochloric acid to induce acidity. The mixture thus obtained is extracted with dichloromethane. The extract is washed with aqueous 2% potassium hydroxide, dried over magnesium sulfate, and stripped of solvent by vacuum distillation. The residue is 3β,17β-diacetoxy-16α,17α-methano - 5α-androstane which, recrystallized from acetone, melts at 178–181°.

EXAMPLE 2

16α,17α-methano-5α-androstane-3β,17β-diol

A solution of 1 part of 3β,17β - diacetoxy - 16α,17α-methano - 5α-androstane in 16 parts of methanol and 2 parts of aqueous 10% potassium hydroxide is allowed to stand at room temperatures for 2 hours, then diluted with 100 parts of water. The resultant precipitate, isolated by filtration, dried, and recrystallized from acetone, affords 16α,17α - methano - 5α-androstane-3β,17β-diol melting at 164–167°.

EXAMPLE 3

17β-acetoxy-16α,17α-methano-5α-androstan-3β-ol

To a solution of 1 part of 3β,17β - diacetoxy-16α,17α-methano-5α-androstane in 63 parts of tetrahydrofuran is consecutively added 112 parts of methanol and approximately 60 parts of a 1:1 mixture of water and saturated aqueous potassium bicarbonate. The resultant mixture is stirred for 3 hours and then diluted with 5 volumes of water. The precipitate which forms is filtered out and chromatographed on silica gel, using benzene and ethyl acetate as developing solvents. From an eluate comprising 5% ethyl acetate in benzene, on evaporation of solvent and recrystallization of the residue from a mixture of dichloromethane and hexane, is obtained 17β-acetoxy-16α,17α - methano - 5α-androstan-3β-ol melting at 134–136°.

EXAMPLE 4

17β-acetoxy-16α,17α-methano-5α-androstan-3-one

To a solution of 16 parts of 17β - acetoxy-16α,17α-methano-5α-androstan-3β-ol in 160 parts of acetone at 5° is slowly added, with stirring, 26 parts of a solution made by dissolving 10 parts of chromium trioxide in 20 parts of water and consecutively diluting with 15 parts of concentrated sulfuric acid and 20 parts of water. The resultant mixture is allowed to stand for 15 minutes, whereupon excess 2-propanol is introduced, followed by 5 volumes of water. The precipitate which forms is filtered out and recrystallized from aqueous methanol to give 17β-acetoxy-16α,17α-methano-5α-androstan-3-one melting at approximately 165–166°.

EXAMPLE 5

17β-hydroxy-16α,17α-methano-5α-androstan-3-one

A solution of 1 part of 17β-acetoxy-16α,17α-methano-5α-androstan-3-one in 16 parts of methanol and 1 part of aqueous 10% potassium hydroxide is stirred at room temperatures for 3 hours and then diluted with 5 volumes of water. The resultant precipitate, isolated by filtration and recrystallized from aqueous acetone, affords 17β-hydroxy - 16α,17α - methano-5α-androstan-3-one melting at 130–134°.

EXAMPLE 6

(A) 3β,5,17-triacetoxy-5α-androst-16-ene

A solution of 65 parts of 3β,5-dihydroxy-5α-androstan-17-one and 4 parts of p-toluenesulfonic acid in 1800 parts of isopropenyl acetate is heated at the boiling point under reflux for 20 hours, then diluted with 3 volumes of ether, consecutively washed with aqueous 5% potassium bicarbonate and water, dried over magnesium sulfate, and stripped of solvent by vacuum distillation. The residue is chromatographed on activated magnesium silicate (Florisil), using benzene and hexane as developing solvents. From an eluate comprising 55% benzene in hexane, on evaporation of solvent and recrystallization of the residue from methanol, 3β,5,17-triacetoxy-5α-androst-16-ene melting at approximately 152–153° is obtained.

(B) 3β,5,17β-triacetoxy-16α-17α-methano-5α-androstane

To a solution of 108 parts of 3β,5,17-triacetoxy-5α-androst-16-ene in 480 parts of butyl ether is added, with stirring, 74 parts of diethylzinc in a nitrogen atmosphere. There is then stirred in, during a 20-minute period, 210 parts of diiodomethane. The resultant mixture is stirred for 24 hours and then cautiously diluted with 80 parts of ethanol, followed by 3 volumes of water and sufficient 5% hydrochloric acid to induce acidity. The mixture thus obtained is extracted with dichloromethane. The extract is washed with aqueous 2% potassium hydroxide, dried over magnesium sulfate, and stripped of solvent by vacuum distillation. The residue is 3β,5,17β-triacetoxy-16α,17α-methano-5α-androstane which, recrystallized from a mixture of dichloromethane and methanol, melts at 230–233°.

EXAMPLE 7

16α,17α-methano-5α-androstane-3β,5,17β-triol

To a solution of 2 parts of lithium tetrahydroaluminate in 280 parts of ether is added, during 20 minutes with stirring, a solution of 28 parts of 3β,5,17β-triacetoxy-16α,17α-methano-5α-androstane in 360 parts of tetrahydrofuran. The resultant mixture is stirred for 20 hours at room temperatures, then slowly diluted with 450 parts of ethyl acetate followed consecutively by 20 parts of water and 10 parts of aqueous 10% potassium hydroxide. The mixture thus obtained is filtered through a mixture of 4 parts of diatomaceous earth with 1 part of magnesium sulfate. The filtrate is stripped of solvent by vacuum distillation; and the residue is crystallized from a mixture of acetone and ethyl acetate to give 16α,17α-methano-5α-androstane - 3β,5,17β-triol solvated with 1 equivalent of ethyl acetate and melting at 178–182°. Solvent can be removed by prolonged heating in vacuo at elevated temperatures.

EXAMPLE 8

5-acetoxy-16α,17α-methano - 5α - androstane-3β,17β-diol and 5,17β-diacetoxy-16α,17α-methano - 5α - androstan-3β-ol To a solution of approximately 1 part of 3β,5,17β-triacetoxy-16α,17α-methano-5α-androstane in 120 parts of methanol is added 10 parts of water and 10 parts of aqueous saturated potassium bicarbonate. The resultant mixture is stirred at room temperatures for 7½ hours, then diluted with 5 volumes of water. The precipitate which forms is filtered out, washed with water, dried in air, and recrystallized from a mixture of acetone and cyclohexane to give 5-acetoxy-16α,17α-methano-5α-androstane-3β,17β-diol hemiacetonate melting at 173–178°, from which the solvent of crystallization can be removed by prolonged heating in vacuo at elevated temperatures. The mother liquors are combined and chromatographed on acid-washed alumina, using benzene and ethyl acetate as developing solvents. From an eluate comprising 20% benzene in ethyl acetate, on evaporation of solvent and crystallization of the residue from ether, 5,17β-diacetoxy-16α,17α-methano-5α-androstan-3β-ol melting at 179–181° is obtained.

EXAMPLE 9

5,17β-diacetoxy-16α,17α-methano-5α-androstan-3-one

A solution of 28 parts of 5,17β-diacetoxy-16α,17α-methano-5α-androstan-3β-ol in 300 parts of pyridine is stirred into a slurry of 30 parts of chromium trioxide with 400 parts of pyridine at 5°. Stirring is continued for 4 hours at ambient temperatures, whereupon the mixture is diluted with 3 volumes of water and extracted with ether. The extract is washed with water, dried over magnesium sulfate, and stripped of solvent by vacuum distillation at less than 35°. The residue is crystallized from a mixture of acetone and hexane to give 5,17β-diacetoxy-16α,17α-methano-5α-androstan-3-one.

EXAMPLE 10

(A) 3β-acetoxy-5α-androstan-17-one dimethyl acetal

To a solution of 520 parts of 3β-acetoxy-5α-androstan-17-one in 2000 parts of methanol and 500 parts of methyl orthoformate is added 6 parts of concentrated sulfuric acid. The resultant solution is heated at the boiling point under reflux for 10 minutes during which precipitation occurs. The mixture is chilled and mixed with 150 parts of pyridine, whereupon insoluble solids are filtered off, washed with methanol, and taken up in dichloromethane. The dichloromethane solution is washed with aqueous 1% potassium hydroxide, dried over magnesium sulfate, and stripped of solvent by vacuum distillation. The residue is 3β-acetoxy-5α-androstan-17-one dimethyl acetal.

(B) 3β-acetoxy-17-methoxy-5α-androst-16-ene

A mixture of 45 parts of 3β-acetoxy-5α-androstan-17-one dimethyl acetal and 270 parts of p-cymene is heated at the boiling point under reflux for 65 hours, then stripped of solvent by vacuum distillation. The amorphous residue is 3β-acetoxy-17-methoxy-5α-androst-16-ene.

(C) 3β-acetoxy-16α,17α-methano-17β-methoxy-5α-androstane

To a solution of 108 parts of 3β-acetoxy-17-methoxy-5α-androst-16-ene in 480 parts of butyl ether is added, with stirring, 74 parts of diethylzinc in a nitrogen atmosphere. There is then stirred in, during a 20-minute period, 210 parts of diiodomethane. The resultant mixture is stirred for 24 hours and then cautiously diluted with 80 parts of ethanol, followed by 3 volumes of water and sufficient 5% hydrochloric acid to induce acidity. The mixture thus obtained is extracted with dichloromethane. The extract is washed with aqueous 2% potassium hydroxide, dried over magnesium sulfate, and stripped of solvent by vacuum distillation. The residue is 3β-acetoxy-16α,17α-methano-17β-methoxy-5α-androstane which, recrystallized from methanol, melts at approximately 129–130°.

EXAMPLE 11

16α,17α-methano-17β-methoxy-5α-androstan-3β-ol

A solution of 1 part of 3β-acetoxy-16α,17α-methano-17β-methoxy-5α-androstane in 16 parts of methanol and 2 parts of aqueous 10% potassium hydroxide is heated at the boiling point under reflux for 1 hour, then diluted with 100 parts of water. The resultant precipitate, isolated by filtration, dried, and recrystallized from a mixture of chloroform and cyclohexane, affords 16α,17α-methano-17β-methoxy-5α-androstan-3β-ol melting at approximately 195–196°.

EXAMPLE 12

16α,17α-methano-17β-methoxy-5α-androstan-3-one

A solution of 28 parts of 16α,17α-methano-17β-methoxy-5α-androstan-3β-ol in 300 parts of pyridine is stirred into a slurry of 30 parts of chromium trioxide with 400 parts of pyridine at 5°. Stirring is continued for 4 hours at ambient temperatures, whereupon the mixture is diluted with 3 volumes of water and extracted with ether. The extract is washed with water, dried over magnesium sulfate, and stripped of solvent by vacuum distillation at less than 35°. The residue is crystallized from a mixture of dichloromethane and methanol to give 16α,17α-methano-17β-methoxy - 5α - androstan-3-one melting at 149–151°.

EXAMPLE 13

3β-acetoxy-17β-ethoxy-16α,17α-methano-5α-androstane

To a solution of 108 parts of 3β-acetoxy-17-ethoxy-5α-androst-16-ene in 480 parts of butyl ether is added, with stirring, 74 parts of diethylzinc in a nitrogen atmosphere. There is then stirred in, during a 20-minute period, 210 parts of diiodomethane. The resultant mixture is stirred for 24 hours and then cautiously diluted with 80 parts of ethanol, followed by 3 volumes of water and sufficient 5% hydrochloric acid to induce acidity. The mixture thus obtained is extracted with dichloromethane. The extract is washed with aqueous 2% potassium hydroxide, dried over magnesium sulfate, and stripped of solvent by vacuum distillation. The residue is 3β-acetoxy-17β-ethoxy-16α,17α-methano-5α-androstane which, recrystallized from methanol, melts at 147–149°.

EXAMPLE 14

17β-ethoxy-16α,17α-methano-5α-androstan-3β-ol

A solution of 1 part of 3β-acetoxy-17β-ethoxy-16α,17α-methano-5α-androstane in 16 parts of methanol and 2 parts of aqueous 10% potassium hydroxide is heated at the boiling point under reflux for 1 hour, then diluted with 100 parts of water. The resultant precipitate, isolated by filtration, dried and recrystallized from a mixture of acetone and hexane, affords 17β-ethoxy-16α,17α-methano-5α-androstan-3β-ol melting at 187–189°.

EXAMPLE 15

17β-ethoxy-16α,17α-methano-5α-androstan-3-one

Substitution of 28 parts of 17β - ethoxy - 16α,17α-methano-5α-androstan-3β-ol for the 5,17β-diacetoxy 16α,17α-methano-5α-androstan-3β-ol called for in Example 9, affords, by the procedure there detailed, 17β-ethoxy-16α,17α-methano-5α-androstan-3-one melting at 142–145°.

EXAMPLE 16

(A) 3β,5-diacetoxy-5α-androstan-17-one

A slurry of 100 parts of 3β,5-dihydroxy-5α-androstan-17-one in 4 parts of p- toluenesulfonic acid, 200 parts of acetic anhydride, and 200 parts of acetic acid is stirred at room temperatures for 4 hours, then diluted with 3 volumes of a 1:1 mixture of ice and water. The resultant mixture is stirred for 1 hour longer, whereupon insoluble solids are filtered off, washed with water, and recrystallized from aqueous acetone to give 3β,5-diacetoxy-5α-androstan-17-one melting at 155–158°.

(B) 3β,5-diacetoxy-5α-androstan-17-one diethyl acetal

To a mixture of 110 parts of 3β,5-diacetoxy-5α-androstan-17-one, 120 parts of ethanol, 125 parts of benzene, and 270 parts of ethyl orthoformate is added 9 parts of concentrated sulfuric acid. The mixture is stirred at room temperatures for 2 hours, whereupon, 20 parts of tetramethylguanidine followed by 5 volumes of benzene is introduced. The resultant mixture is consecutively washed with aqueous 1% potassium hydroxide and water, dried over magnesium sulfate, and stripped of solvent by vacuum distillation. The residue is 3β,5-diacetoxy-5α-androstan-17-one diethyl acetal which, recrystallized from a mixture of methanol and ether, melts at approximately 176–177°.

(C) 3β,5-diacetoxy-17-ethoxy-5α-androst-16-ene

A mixture of 63 parts of 3β,5-diacetoxy-5α-androstan-17-one diethyl acetal, 1 part of pyridine, and 1250 parts of p-cymene is heated at the boiling point under reflux for 20 hours, whereupon solvent is removed by vacuum distillation. The residue is 3β,5-diacetoxy-17-ethoxy-5α-androst-16-ene.

(D) 3β,5-diacetoxy-17β-ethoxy-16α,17α-methano-5α-androstane

To a solution of 108 parts of 3β,5-diacetoxy-17-ethoxy-5α-androst-16-ene in 480 parts of butyl ether is added, with stirring, 74 parts of diethylzinc in a nitrogen atmosphere. There is then stirred in, during a 20-minute period, 210 parts of diiodomethane. The resultant mixture is stirred for 24 hours and then cautiously diluted with 80 parts of ethanol, followed by 3 volumes of water and sufficient 5% hydrochloric acid to induce acidity. The mixture thus obtained is extracted with dichloromethane. The extract is washed with aqueous 2% potassium hydroxide, dried over magnesium sulfate, and stripped of solvent by vacuum distillation. The residue is 3β,5-diacetoxy - 17β-ethoxy-16α,17α-methano-5α-androstane which, recrystallized from a mixture of dichloromethane and methanol, melts at 194–197°.

EXAMPLE 17

17β-ethoxy-16α,17α-methano-5α-androstane-3β,5-diol

To a solution of 2 parts of lithium tetrahydroaluminate in 280 parts of ether is added, during 20 minutes with stirring, a solution of 28 parts of 3β,5-diacetoxy-17β-ethoxy-16α,17α-methano-5α-androstane in 360 parts of tetrahydrofuran. The resultant mixture is stirred for 20 hours at room temperatures, then slowly diluted with 450 parts of ethyl acetate followed consecutively by 20 parts of water and 10 parts of aqueous 10% potassium hydroxide. The mixture thus obtained is filtered through a mixture of 4 parts of diatomaceous earth with 1 part of magnesium sulfate. The filtrate is stripped of solvent by vacuum distillation; and the residue is crystallized from a mixture of acetone, hexane, and ether to give 17β-ethoxy-16α,17α-methano-5α-androstane-3β,5-diol as the hemiacetonate melting at 204–206°. Solvent can be removed by prolonged heating in vacuo at elevated temperatures.

EXAMPLE 18

17β-ethoxy-5-hydroxy-16α,17α-methano-5α-androstan-3-one

A solution of 28 parts of 17β-ethoxy-16α,17α-methano-5α-androstane-3β,5-diol in 300 parts of pyridine is stirred into a mixture of 30 parts of chromium trioxide with 400 parts of pyridine at 5°. The resultant mixture is stirred for 4 hours at ambient temperatures, then diluted with 3 volumes of water and extracted with ether. The extract is washed with water, dried over magnesium sulfate, and stripped of solvent by vacuum distillation. The residue is 17β - ethoxy - 5-hydroxy-16α,17α-methano-5α-androstan-3-one.

EXAMPLE 19

5-acetoxy-17β-ethoxy-16α,17α-methano-5-androstan-3β-ol

A mixture of 14 parts of 3β,5-diacetoxy-17β-ethoxy-16α,17α-methano-5α-androstane, 1200 parts of methanol, 50 parts of water, and 100 parts of aqueous saturated potassium bicarbonate is stirred at room temperatures for 8 hours, then diluted with 6 volumes of water. The resultant precipitate is filtered off, washed with water, dried in air, and recrystallized from a mixture of acetone and hexane to give 5 - acetoxy - 17β - ethoxy-16α,17α-methano-5α-androstan-3β-ol melting at 186–189°.

EXAMPLE 20

5-acetoxy-17β-ethoxy-16α,17α-methano-5α-androstan-3-one

Substitution of 28 parts of 5-acetoxy-17β-ethoxy-16α,17α-methano-5α-androstan-3β-ol for the 17β-ethoxy-16α,17α-methano-5α-androstane-3β,5-diol called for in Example 18 affords, by the procedure there detailed, 5-acetoxy - 17β - ethoxy-16α,17α-methano-5α-androstan-3-one which, recrystallized from acetone, melts at approximately 175–176°.

EXAMPLE 21

17β-acetoxy-16α,17α-methanoandrost-5-en-3β-ol

A solution of 2 parts of 5,17β-diacetoxy-16α,17α-methano-5α-androstan-3β-ol in 45 parts of benzene is adsorbed on 160 parts of alumina moistened with benzene. Elution with 5% ethyl acetate in benzene 48 hours later affords, after evaporation of solvent and recrystallization of the residue from a mixture of dichloromethane and hexane, 17β-acetoxy-16α,17α-methanoandrost-5-en-3β-ol melting in the range 118–126°.

EXAMPLE 22

17β-acetoxy-16α,17α-methanoandrost-4-en-3-one

A solution of 8 parts of 17β-acetoxy-16α,17α-methanoandrost-5-en-3β-ol and 20 parts of cyclohexanone in 1045 parts of toluene is distilled to 80% of its original volume, whereupon 9 parts of aluminum isopropoxide dissolved in approximately 50 parts of toluene is slowly added to the boiling solution. After 15 minutes, the boiling solution is allowed to cool and excess Rochelle salt solution is introduced. The resultant mixture is steam distilled for ½ hour, whereupon the precipitate which forms is filtered out and recrystallized from a mixture of dichloromethane and hexane to give 17β-acetoxy-16α,17α-methanoandrost-4-en-3-one melting at 208–211°.

EXAMPLE 23

17β-hydroxy-16α,17α-methanoandrost-4-en-3-one

A solution of 14 parts of 17β-acetoxy-16α,17α-methanoandrost-4-en-3-one in 400 parts of methanol and 25 parts of aqueous 10% potassium hydroxide is stirred at room temperatures for 3 hours. The solution is then diluted with 5 volumes of water, and the resultant mixture is extracted with dichloromethane. The extract is washed with water, dried over magnesium sulfate, and stripped of solvent by vacuum distillation. The residue is 17β-hydroxy-16α,17α-methanoandrost-4-en-3-one which, crystallized from aqueous acetone, melts at 77–81°.

EXAMPLE 24

16α,17α-methanoandrost-5-ene-3β,17β-diol

A solution of 14 parts of 17β-acetoxy-16α,17α-methanoandrost-5-en-3β-ol in 400 parts of methanol and 25 parts of aqueous 10% potassium hydroxide is stirred at room temperatures for 3 hours. The solution is then diluted with 5 volumes of water, and the resultant mixture is extracted with dichloromethane. The extract is washed with water, dried over magnesium sulfate, and stripped of solvent by vacuum distillation. The residue is 16α,17α-methanoandrost-5-ene-3β,17β-diol, which is further purified by crystallization from a mixture of acetone and hexane.

EXAMPLE 25

17β-ethoxy-16α,17α-methanoandrost-5-en-3β-ol

A solution of 2 parts of 5-acetoxy-17β-ethoxy-16α,17α-methano-5α-androstan-3β-ol in 45 parts of benzene is adsorbed on 160 parts of alumina moistened with benzene. Elution with 5% ethyl acetate in benzene 48 hours later affords, after evaporation of solvent and recrystallization of the residue from a mixture of ether and hexane, 17β-ethoxy-16α,17α-methanoandrost - 5 - en - 3β - ol melting at 151–153°.

EXAMPLE 26

3β-acetoxy-17β-ethoxy-16α,17α-methanoandrost-5-ene

A solution of 1 part of 17β-ethoxy-16α,17α-methanoandrost-5-en-3β-ol in 10 parts of pyridine and 5 parts of acetic anhydride is heated at 95° for 10 minutes, then cooled to room temperature and diluted with 1 part of water. The resulting mixture is allowed to stand for 10 minutes whereupon 3 volumes of water is introduced and the precipitate which forms is filtered off, washed with water, dried in air, and recrystallized from aqueous acetone to give 3β-acetoxy-17β-ethoxy-16α,17α-methanoandrost-5-ene.

EXAMPLE 27

17β-ethoxy-16α,17α-methanoandrost-4-en-3-one

A solution of 8 parts of 17β-ethoxy-16α,17α-methanoandrost-5-en-3β-ol and 20 parts of cyclohexanone in 1045 parts of toluene is distilled to 80% of its original volume, whereupon 9 parts of aluminum isopropoxide dissolved in approximately 50 parts of toluene is added. After 15 minutes, the boiling solution is allowed to cool; and excess Rochelle salt solution is introduced. The resultant mixture is steam distilled for ½ hour, and the precipitate which thereupon forms is filtered off and recrystallized from a mixture of acetone and hexane to give 17β-ethoxy-16α,17α-methanoandrost-4-en-3-one melting at 166–168°.

EXAMPLE 28

(A) 17-ethoxy-3-methoxyestra-1,3,5(10),16-tetraene

A solution of 100 parts of 3-methoxyestra-1,3,5(10)-trien-17-one diethyl acetal in 430 parts of cymene is distilled at atmospheric pressure to ½ it original volume during 48 hours, whereupon the remainder of the solvent is removed by vacuum distillation. The residue is 17-ethoxy-3-methoxyestra-1,3,5(10),16-tetraene.

(B) 17β-ethoxy-16α,17α-methano-3-methoxyestra-1,3,5(10)-triene

Substitution of 101 parts of 17-ethoxy-3-methoxyestra-1,3,5(10),16-tetraene for the 3β-acetoxy-17-methoxy-5α-androst-16-ene called for in Example 10C affords, by the procedure there detailed, 17β-ethoxy-16α,17α-methano-3-methoxyestra-1,3,5(10)-triene melting at 88–90°.

(C) 17β-ethoxy-16α,17α-methano-3-methoxyestra-2,5(10)-diene

To 545 parts of liquid ammonia and 320 parts of tert.-butyl alcohol is added a solution of 23 parts of 17β- ethoxy-16α,17α-methano - 3 - methoxyestra - 1,3,5(10)-triene in 360 parts of tetrahydrofuran followed, portionwise, by 4 parts of lithium wire. After 40 minutes, sufficient solid ammonium chloride (approximately 10 parts) is introduced, portionwise, to cause the blue color to disappear. The ammonia is thereupon evaporated, and organic solvents are removed from the residue by steam distillation. From the distilland, on cooling, 17β-ethoxy-16α,17α - methano - 3 - methoxyestra - 2,5(10) - diene precipitates. Filtered off, washed with water, dried in air, and recrystallized from a mixture of dichloromethane and methanol, the product melts at 93–95°.

(D) 17β-ethoxy-16α,17α-methanoestra-4-en-3-one

A solution of 14 parts of 17β-ethoxy-16α,17α-methano-3-methoxyestra-2,5(10)-diene in 240 parts of methanol, 60 parts of water, and approximately 28 parts of concentrated hydrochloric acid is allowed to stand at room temperatures for 2 hours, whereupon 5 volumes of water is mixed in. Insoluble solids are filtered off, washed with water, dried in air, and recrystallized from a mixture of dichloromethane and hexane to give 17β-ethoxy-16α,17α-methanoestr-4-en-3-one melting at 130–133°.

EXAMPLE 29

17β-ethoxy-16α,17α-methanoestr-5(10)-en-3-one

To 100 parts of aqueous 95% acetic acid is added, with stirring, 5 parts of 17β-ethoxy-16α,17α-methano-3-methoxyestra-2,5(10)-diene. After 25 minutes, the resultant solution is diluted with 5 volumes of water and the precipitate which forms is filtered off and recrystallized from aqueous methanol to give 17β - ethoxy - 16α,17α-methanoestr-5(10)-en-3-one melting at 94–98°.

EXAMPLE 30

17β-ethoxy-16α,17α-methanoestra-4,9-dien-3-one

To a solution of 3 parts of 17β - ethoxy - 16α,17α-methanoestra-5(10)-en-3-one in 30 parts of pyridine at 5° is added 4 parts of pyridinium bromide perbromide. An orange precipitate forms. After 15 minutes, 5 volumes of water is introduced; and the precipitate is filtered out, dried in air, and stirred into 50 parts of pyridine. Solution occurs. After 2 hours, 5 volumes of water is introduced and the resultant mixture extracted with benzene. The extract is washed with water, dried over anhydrous magnesium sulfate, and stripped of solvent by vacuum distillation. The residue is recrystallized from a mixture of ether and hexane, using decolorizing charcoal in process, to afford 17β - ethoxy - 16α,17α - methanoestra-4,9-dien-3-one melting at 102–104°.

EXAMPLE 31

(A) 17β-ethoxy-16α,17α-methanoestra-5(10),9(11)-dien-3-one dimethyl acetal

To a solution of 2 parts of hydrogen chloride in 160 parts of absolute methanol is added 3 parts of 17β-ethoxy-16α,17α-methanoestra-4,9-dien-3-one. After 15 minutes, the resultant solution is chilled to 5°, whereupon excess solid sodium methoxide is added. Approximately 5 volumes of water is then introduced; and the resultant crystalline mass is filtered off, washed with water, dried in air, and recrystallized from methanol to give 17β-ethoxy-16α,17α-methanoestra-(5(10),9(11)-dien-3-one dimethyl acetal melting at 89–96°.

(B) 17β-ethoxy-16α,17α-methanoestra-5(10),9(11)-dien-3-one

To a mixture of 5 parts of aqueous 10% sulfuric acid and 320 parts of acetone is added 13 parts of 17β-ethoxy-16α,17α - methanoestra - 5(10),9(10) - dien - 3 - one dimethyl acetal. The resultant mixture is allowed to stand for 5 minutes at room temperature, whereupon 5 volumes of water is introduced; and the precipitate which forms is isolated by filtration, washed with water, dried in air, and recrystallized from aqueous acetone to give 17β - ethoxy - 16α,17α - methanoestra - 5(10),9(11)-dien-3-one melting at 123–126°.

EXAMPLE 32

17β-ethoxy-16α,17α-methanoestra-4,9,11-trien-3-one

To a solution of 9 parts of 17β - ethoxy - 16α,17α-methanoestra - 5(10),9(11) - dien - 3 - one in 450 parts of benzene is added a solution of 15 parts of dichlorodicyanoquinone in 450 parts of benzene. Approximately 2 hours later, the resultant solution is consecutively washed with water and aqueous 2% sodium thiosulfate, dried over anhydrous magnesium sulfate, and stripped of solvent by vacuum distillation. The residue is 17β-ethoxy-16α,17α-methanoestra-4,9,11-trien-3-one.

EXAMPLE 33

(A) 16α,17α-methano-3-methoxyestra-1,3,5(10)-trien-17β-ol

To a stirred solution of 50 parts of 17β-acetoxy-16α,17α - methano - 3 - methoxyestra - 1,3,5(10) - triene in 1400 parts of ether at 5° under nitrogen is slowly added a solution of 9 parts of methyllithium in 140 parts of ether. Cooling is stopped; but stirring is continued for 10 minutes at ambient temperatures, whereupon the resultant mixture is poured into a suspension of 100 parts of boric acid in 5000 parts of water. The ether phase is separated, washed with water, dried over anhydrous magnesium sulfate, and stripped of solvent by vacuum distillation. The residue is 16α,17α - methano - 3 - methoxyestra - 1,3,5(10) - trien - 17β - ol, which can be further purified by recrystallization from a mixture of ether and hexane.

(B) 16α,17α-methano-3-methoxy-17β-trimethylsiloxyestra-1,3,5(10)-triene

To a solution of 5 parts of 16α,17α - methano - 3-methoxyestra - 1,3,5(10) - trien - 17β - ol in 155 parts of ether is added a solution of 36 parts of hexamethyldisilazane in 500 parts of pyridine, followed by 22 parts of trimethylchlorosilane. The reaction mixture is stirred at room temperatures for 3 hours, then diluted with 3 volumes of water. The resultant mixture is extracted with ether. The ether extract was washed with water, dried over anhydrous magnesium sulfate, and stripped of solvent by vacuum distillation. The residue is 16α,17α - methano-3 - methoxy - 17β - trimethylsiloxyestra - 1,3,5(10)-triene, which can be further purified by crystallization from pentane.

(C) 16α,17α-methano-3-methoxy-17β-trimethylsiloxyestra-2,5(10)-diene

To 680 parts of liquid ammonia is added, with stirring, a solution of 19 parts of 16α,17α - methano - 3 - methoxy-17β - trimethylsiloxyestra - 1,3,5(10) - triene in a mixture of 270 parts of tetrahydrofuran and 240 parts of tert.-butyl alcohol, followed by 5 parts of lithium. Stirring is continued for 20 minutes, whereupon sufficient solid ammonium chloride (approximately 19 parts) is added to discharge the blue color. Ammonia is distilled off by slowly warming to 10°; and temperatures are maintained below 15° while 5 volumes of water is introduced, the reaction mixture is extracted with dichloromethane, and the extract is washed with water and dried over anhydrous magnesium sulfate. Solvent is removed by vacuum distillation. The residue is 16α,17α - methano - 3 - methoxy - 17β - trimethylsiloxyestra - 2,5(10) - diene, which can be further purified by crystallization from hexane.

(D) 16α,17α-methano-17β-hydroxyestr-5(10)-en-3-one

A solution of 14 parts of 16α,17α - methano - 3 - methoxy - 17β - trimethylsiloxyestra - 2,5(10) - diene in 900 parts of aqueous 90% acetic acid is allowed to stand for 15 minutes, then diluted with 3 volumes of water.

The resultant mixture is extracted with benzene; and the extract is washed with aqueous 2% sodium bicarbonate, dried over anhydrous magnesium sulfate, and stripped of solvent by vacuum distillation. The residue is 16α,17α-methano - 17β - hydroxyestr - 5(10) - en - 3 - one, which can be further purified by crystallization from a mixture of acetone and hexane.

EXAMPLE 34

16α,17α-methano-17β-hydroxyestr-4-en-3-one

To a solution of 1 part of 16α,17α - methano - 3 - methoxy - 17β - trimethylsiloxyestra - 2,5(10) - diene in 8 parts of methanol is added 1 part of 10% hydrochloric acid. The resultant solution is allowed to stand at room temperatures for 1 hour, whereupon 3 volumes of water is introduced and the mixture thus obtained is extracted with dichloromethane. The extract is washed with aqueous 2% sodium bicarbonate, dried over anhydrous magnesium sulfate, and stripped of solvent by vacuum distillation. The residue is 16α,17α - methano - 17β - hydroxyestr-4-en-3-one, which can be further purified by crystallization from a mixture of acetone and hexane.

EXAMPLE 35

17β-acetoxy-16α,17α-methanoestr-4-en-3-one

A solution of 2 parts of 16α,17α-methano-17β-hydroxyestr-4-en-3-one in 10 parts of pyridine and 5 parts of acetic anhydride is allowed to stand at room temperatures for 16 hours, whereupon ½ volume of water is introduced during 20 minutes and a further 2½ volumes of water is rapidly introduced thereafter. The resultant mixture is extracted with benzene. The benzene extract is washed with aqueous 2% sodium bicarbonate, dried over anhydrous magnesium sulfate, and stripped of solvent by vacuum distillation. The residue is 17β-acetoxy-16α,17α-methanoestr-4-en-3 - one, which can be further purified by crystallization from aqueous acetone.

EXAMPLE 36

17β-acetoxy-16α,17α-methanoestr-5(10)-en-3-one

Substitution of 2 parts of 16α,17α-methano-17β-hydroxyestr-5(10)-en-3-one for the 16α,17α-methano-17β-hydroxyestr-4-en-3-one called for in Example 35 affords, by the procedure there detailed, 17β-acetoxy-16α,17α-methanoestr-5(10)-en-3-one.

EXAMPLE 37

17β-acetoxy-16α,17α-methanoestra-4,9-dien-3-one

Substitution of 3 parts of 17β-acetoxy-16α,17α-methanoestr-5(10)-en-3-one for the 17β-ethoxy-16α,17α-methanoestra-5(10)-en-3-one called for in Example 30 affords, by the procedure there detailed, 17β-acetoxy-16α,17α-methanoestra-4,9-dien-3-one.

EXAMPLE 38

17β-hydroxy-16α,17α-methanoestra-4,9-dien-3-one

A solution of 1 part of 17β-acetoxy-16α,17α-methanoestra-4,9-dien-3-one in 12 parts of methanol is concentrated to ⅔ of the original volume by vacuum distillation under nitrogen, whereupon 1 part of aqueous 10% potassium hydroxide prepared from deoxygenated water in a nitrogen atmosphere is introduced. The reaction mixture is maintained under nitrogen for 3 hours, at which point 3 volumes of water is added and the mixture thus obtained is extracted with dichloromethane. The dichloromethane extract is washed with water, dried over anhydrous magnesium sulfate, and stripped of solvent by vacuum distillation. The residue is 17β-hydroxy-16α,17α-methanoestra-4,9-dien-3-one, which can be further purified by crystallization from a mixture of acetone and hexane.

EXAMPLE 39

(A) 17β-acetoxy-16α,17α-methanoestra-5(10),9(11)-dien-3-one dimethyl acetal

Substitution of 3 parts of 17β-acetoxy-16α,17α-methanoestra-4,9-dien-3-one for the 17β-ethoxy-16α,17α-methanoestra-4,9-dien-3-one called for in Example 31A affords, by the procedure there detailed, 17β-acetoxy-16α,17α-methanoestra-5(10),9(11)-dien-3-one dimethyl acetal.

(B) 17β-acetoxy-16α,17α-methanoestra-5(10),9(11)-dien-3-one

Substitution of 13 parts of 17β-acetoxy-16α,17α-methanoestra-5(10),9(11)-dien-3-one dimethyl acetal for the 17β-ethoxy-16α,17α-methanoestra-5(10),9(11) - dien - 3-one dimethyl acetal called for in Example 31B affords, by the procedure there detailed, 17β-acetoxy-16α,17α-methanoestra-5(10),9(11)-dien-3-one.

EXAMPLE 40

17β-acetoxy-16α,17α-methanoestra-4,9,11-trien-3-one

Substitution of 9 parts of 17β-acetoxy-16α,17α-methanoestra-5(10),9(11)-dien-3-one for the 17β-ethoxy-16α,17α-methanoestra-5(10),9(11)-dien-3-one called for in Example 32 affords, by the procedure there detailed, 17β-acetoxy-16α,17α-methanoestra-4,9,11-trien-3-one.

EXAMPLE 41

17β-hydroxy-16α,17α-methanoestra-4,9,11-triene-3-one

Substitution of 1 part of 17β-acetoxy-16α,17α-methanoestra-4,9,11-trien-3-one for the 17β-acetoxy-16α,17α-methanoestra-4,9-dien-3-one called for in Example 38 affords, by the procedure there detailed, 17β-hydroxy-16α,17α-methanoestra-4,9,11-trien-3-one.

What is claimed is:

1. A compound selected from the group consisting of compounds of the formulas

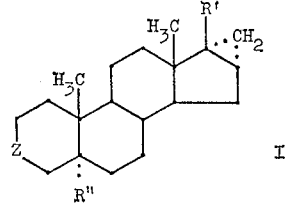

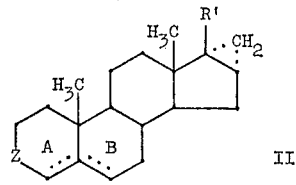

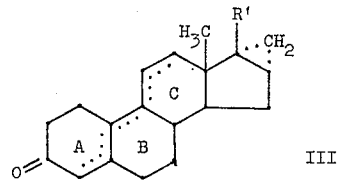

wherein R′ represents hydroxy, (lower alkanoyl)oxy, or lower alkoxy; R″ represents hydrogen, hydroxy, or (lower alkanoyl)oxy; Z represents β-hydroxymethylene, β-[(lower alkanoyl)oxy]methylene, or carbonyl; the dotted lines in rings A and B of Formula II signify Δ⁴ unsaturation when Z therein represents carbonyl and Δ⁵ unsaturation when it does not; and the dotted lines in rings A, B, and C of Formula III signify Δ⁴, Δ⁵⁽¹⁰⁾, Δ⁴,⁹, Δ⁵⁽¹⁰⁾,⁹⁽¹¹⁾, or Δ⁴,⁹,¹¹ unsaturation.

2. A compound according to claim 1 having the formula

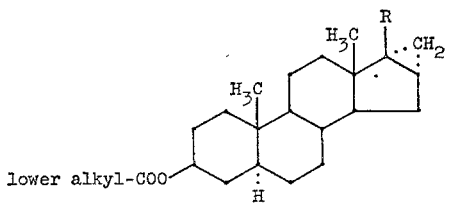

wherein R represents (lower alkanoyl)oxy or lower alkoxy.

3. A compound according to claim 1 which is 3β-acetoxy-17β-ethoxy-16α,17α-methano-5α-androstane.

4. A compound according to claim 1 having the formula

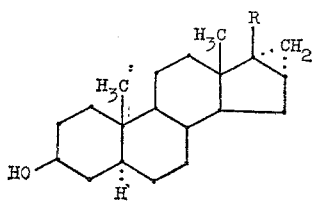

wherein R represents hydroxy, (lower alkanoyl)oxy, or lower alkoxy.

5. A compound according to claim 1 which is 17β-ethoxy-16α,17α-methano-5α-androstan-3β-ol.

6. A compound according to claim 1 having the formula

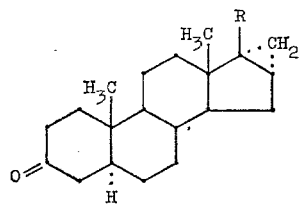

wherein R represents hydroxy, (lower alkanoyl)oxy, or lower alkoxy.

7. A compound according to claim 1 which is 17β-ethoxy-16α,17α-methano-5α-androstan-3-one.

8. A compound according to claim 1 having the formula

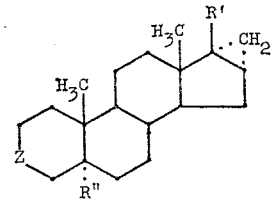

wherein R' represents hydroxy, (lower alkanoyl)oxy, or lower alkoxy; R" represents hydroxy or (lower alkanoyl)oxy; and Z represents β-hydroxymethylene, β-[(lower alkanoyl)oxy]methylene, or carbonyl.

9. A compound according to claim 1 which is 5-acetoxy-17β-ethoxy-16α,17α - methano-5α - androstan-3-one.

10. A compound according to claim 1 having the formula

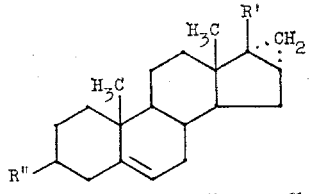

wherein R' represents hydroxy, (lower alkanoyl)oxy, or lower alkoxy and R" represents hydroxy or (lower alkanoyl)oxy.

11. A compound according to claim 1 which is 17β-acetoxy-16α,17α-methanoandrost-5-en-3β-ol.

12. A compound according to claim 1 having the formula

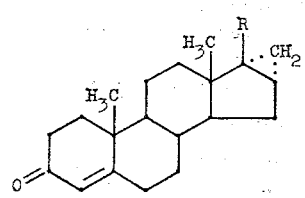

wherein R represents hydroxy, (lower alkanoyl)oxy, or lower alkoxy.

13. A compound according to claim 1 which is 17β-acetoxy-16α,17α-methanoandrost-4-en-3-one.

14. A compound according to claim 1 having the formula

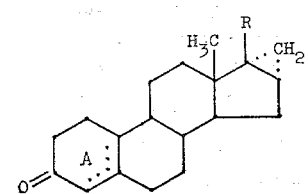

wherein R represents hydroxy, (loweralkanoyl)oxy, or lower alkoxy and the dotted line in ring A signifies $\Delta^4$ or $\Delta^{5(10)}$ unsaturation.

15. A compound according to claim 1 which is 17β-ethoxy-16α,17α-methanoester-4-en-3-one.

16. A compound according to claim 1 having the formula

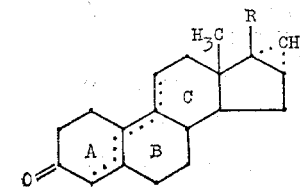

wherein R represents hydroxy, (lower alkanoyl)oxy, or lower alkoxy and the dotted lines in rings A, B, and C signify $\Delta^{4,9}$ or $\Delta^{5(10),9(11)}$ unsaturation.

17. A compound according to claim 1 which is 17β-ethoxy-16α,17α-methanoestra-4,9-dien-3-one.

18. A compound according to claim 1 having the formula

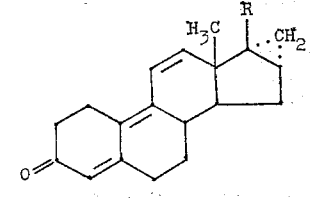

wherein R represents hydroxy, (lower alkanoyl)oxy, or lower alkoxy.

19. A compound according to claim 1 which is 17β-ethoxy-16α,17α-methanoestra-4,9,11-triene-3-one.

References Cited

UNITED STATES PATENTS 3,492,318  1/1970  Crabbe _____ 260—397.3

LEWIS GOTTS, Primary Examiner

E. G. LOVE, Assistant Examiner

U.S. Cl. X.R.

260—397.45, 397.5; 425—238, 243